US012585220B2

(12) United States Patent
Nakamura et al.

(10) Patent No.: US 12,585,220 B2
(45) Date of Patent: Mar. 24, 2026

(54) IMAGE FORMING SYSTEM

(71) Applicant: Konica Minolta, Inc., Tokyo (JP)

(72) Inventors: Atsushi Nakamura, Saitama (JP); Nobuyasu Tamura, Hachioji (JP); Shinichi Tsukamura, Uenohara (JP); Masahiro Onodera, Hino (JP); Ryo Fujimitsu, Tachikawa (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 18/759,573

(22) Filed: Jun. 28, 2024

(65) Prior Publication Data

US 2025/0013182 A1 Jan. 9, 2025

(30) Foreign Application Priority Data

Jul. 7, 2023 (JP) ................................ 2023-112325

(51) Int. Cl.
*G03G 15/00* (2006.01)

(52) U.S. Cl.
CPC ......... *G03G 15/5062* (2013.01); *G03G 15/55* (2013.01); *G03G 2215/00042* (2013.01)

(58) Field of Classification Search
CPC ............... G03G 15/5062; G03G 15/55; G03G 2215/00042
See application file for complete search history.

(56) References Cited

U.S. PATENT DOCUMENTS

2012/0195606 A1* 8/2012 Miyajima ............ G03G 15/657 399/68
2020/0051231 A1* 2/2020 Tsukamoto ........... G06T 7/0002
2021/0042065 A1* 2/2021 Yamamoto .............. G06F 3/121
2022/0075305 A1* 3/2022 Isozaki ............. G03G 15/5041

FOREIGN PATENT DOCUMENTS

JP 2013007824 A * 1/2013
JP 2013-29850 A 2/2013
JP 2014-215591 A 11/2014

OTHER PUBLICATIONS

Machine Translation of JP 2014-215591. Nov. 17, 2014. (Year: 2014).*

* cited by examiner

*Primary Examiner* — Carla J Therrien
(74) *Attorney, Agent, or Firm* — LUCAS & MERCANTI, LLP

(57) ABSTRACT

There is provided an image forming system including an object that is an element included in an image former that forms an image on a recording medium and that moves in a main scanning direction during an operation related to image formation based on a print job, a hardware processor that acquires position information of the object in the main scanning direction during the operation, and a reader that reads the image on the recording medium formed by the operations, in which the hardware processor determines a state of the object on a basis of the acquired position information and read image data read by the reader.

17 Claims, 10 Drawing Sheets

IMAGE FORMING SYSTEM

CROSS-REFERENCE TO RELATED APPLICATIONS

The entire disclosure of Japanese Patent Application No. 2023-112325, filed on Jul. 7, 2023, including description, claims, drawings and abstract is incorporated herein by reference.

BACKGROUND OF THE INVENTION

Technical Field

The present invention relates to an image forming system.

Description of Related Art

There has been conventionally known an image forming apparatus that forms an image on a sheet by an electrophotographic method. The image forming apparatus develops an electrostatic latent image formed on the photoreceptor with toners. Next, the image forming apparatus transfers a toner image onto a sheet in a transfer part. Then, the image forming apparatus fixes the toner image in a fixer.

When damage, adhesion of foreign matter, or the like is generated in the photoreceptor, the transfer part, and the fixer, an image defect such as streak-like density unevenness occurs along a sub-scanning direction of an image to be formed.

In this regard, JP 2013-29850A discloses an image forming apparatus in which a fixer is swung in a main scanning direction, thereby suppressing the occurrence of damage from a sheet edge to the fixer while a sheet passes.

JP 2014-215591A discloses an image forming apparatus in which each of units constituting the apparatus is moved in a main scanning direction, and a unit causing density unevenness is specified from an amount of positional change of the density unevenness between before and after the movement.

SUMMARY OF THE INVENTION

In the invention disclosed in JP 2014-215591A, a unit that causes the density unevenness is specified in an abnormal portion specifying mode that is different from a normal image forming mode in which image formation of a print job is performed. In other words, in the invention disclosed in JP 2014-215591A, the state of the unit is determined in the abnormal portion specifying mode. Therefore, in order to determine the state of an object that is the unit, the abnormal portion specifying mode has to be executed in addition to the normal image forming mode, which requires time and effort.

An object of the present invention is to provide an image forming system that can reduce time and effort for determining a state of an object.

To achieve at least one of the abovementioned objects, according to an aspect of the present invention, an image forming system reflecting one aspect of the present invention includes:

an object that is an element included in an image former that forms an image on a recording medium and that moves in a main scanning direction during an operation related to image formation based on a print job;

a hardware processor that acquires position information of the object in the main scanning direction during the operation; and a reader that reads the image on the recording medium formed by the operations, wherein the hardware processor determines a state of the object on a basis of the acquired position information and read image data read by the reader.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention, wherein.

DETAILED DESCRIPTION

Hereinafter, one or more embodiments of the present invention will be described with reference to the drawings. However, the scope of the invention is not limited to the disclosed embodiments.

1. Configuration of Image Forming Apparatus

Figure 1:
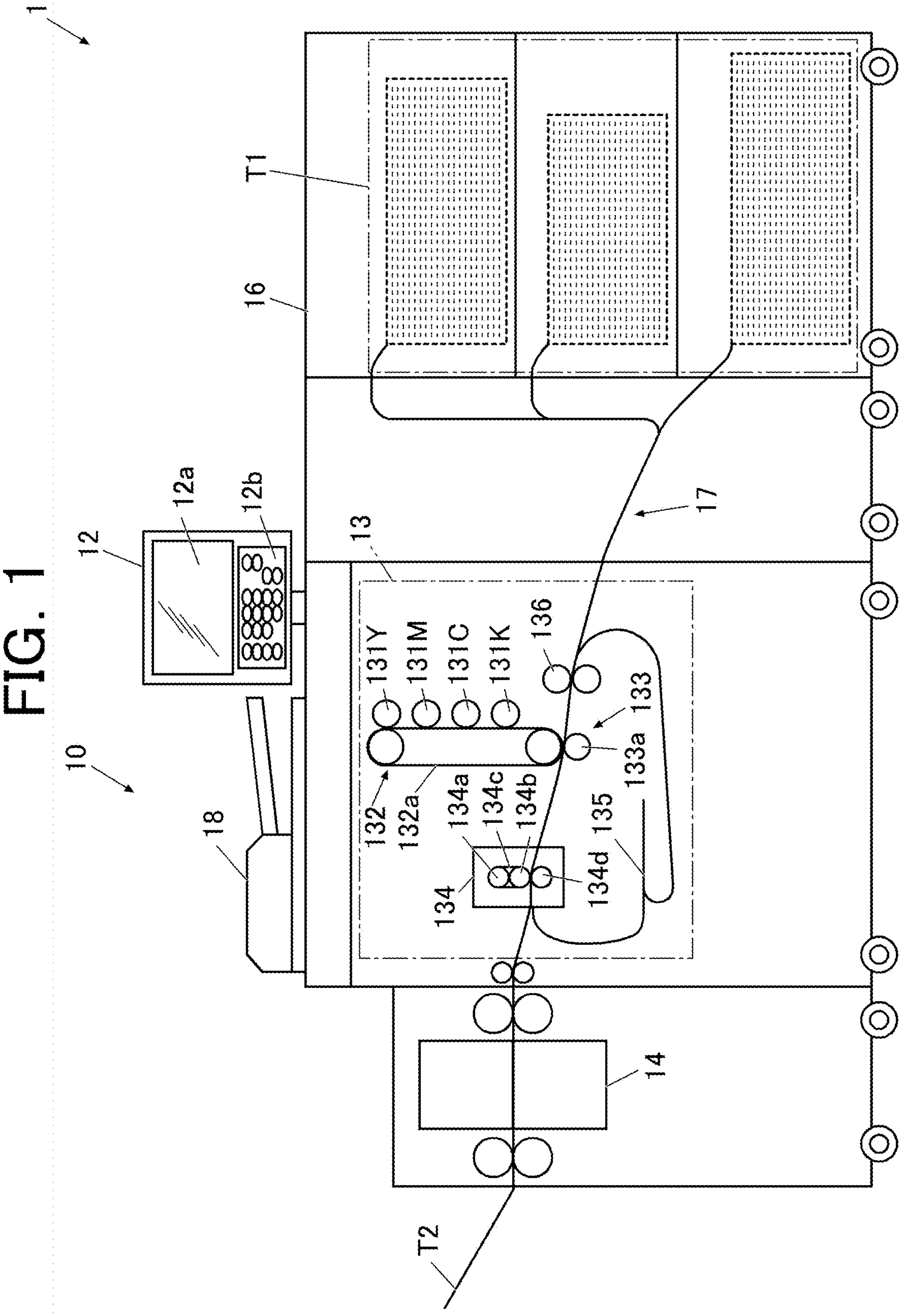
FIG. 1 is a front view illustrating a schematic configuration of an image forming apparatus according to the present embodiment.
Figure 2:
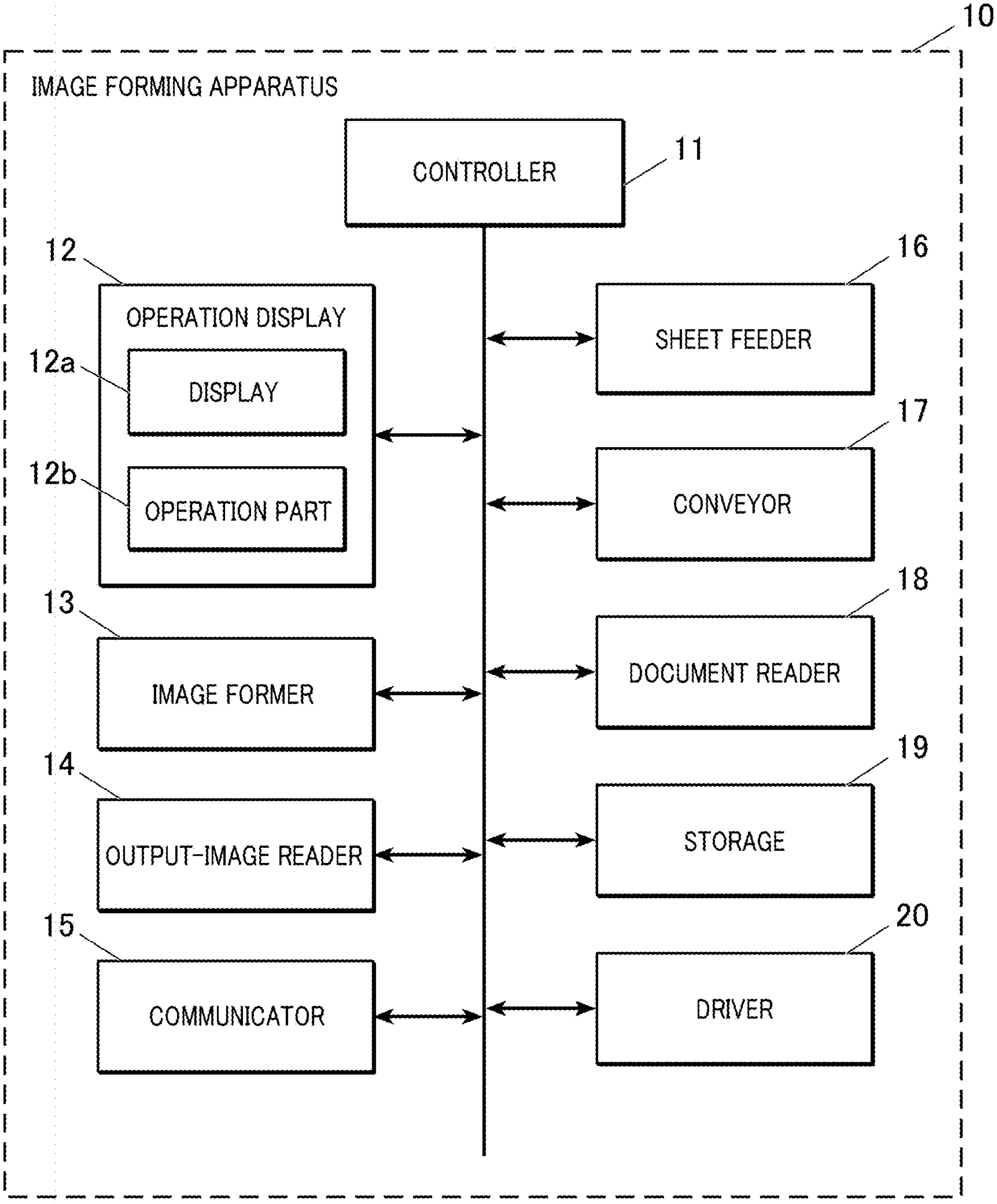
FIG. 2 is a functional block diagram illustrating a control structure of the image forming apparatus according to the present embodiment.

FIG. 1 is a schematic diagram illustrating a schematic configuration of an image forming apparatus 10 according to the present embodiment. FIG. 2 is a block diagram illustrating a functional configuration of the image forming apparatus 10 according to the present embodiment.

An image forming system 1 according to the present embodiment includes the image forming apparatus 10.

The image forming apparatus 10 includes a controller 11 (i.e., a hardware processor), an operation display 12, an image former 13, an output-image reader 14, a communicator 15, a sheet feeder 16, a conveyor 17, a document reader 18, a storage 19, and a driver 20.

The controller 11 includes a central processing unit (CPU), a read only memory (ROM), a random access memory (RAM), and the like.

The CPU reads out a program corresponding to processing contents from the ROM, and develops it in the RAM. Next, the CPU cooperates with the developed program to perform centralized control of an operation of each block of the image forming apparatus 10.

The operation display 12 includes a display 12*a* and an operation part 12*b*.

The display 12*a* includes a liquid crystal display (LCD) or the like, and displays various screens according to an instruction of a display signal input from the controller 11.

The operation part 12*b* includes various function keys, and a touch screen formed so as to cover a display screen of the display 12*a*, and receives various operations from a user.

The image former 13 forms an image on the sheet being conveyed by the conveyor 17 by an electrophotographic method.

The image former 13 includes photosensitive drums 131Y, 131M, 131C, and 131K, an intermediate transfer unit 132, a secondary transfer unit 133, a fixing unit 134, a reversing path 135, a register 136 and the like.

The photosensitive drums 131Y, 131M, 131C, and 131K are photoreceptors corresponding to respective colors of yellow (Y), magenta (M), cyan (C), and black (K).

The photoreceptors are held in the image forming apparatus 10 so as to be movable from predetermined positions in a main scanning direction of an image. The main scanning direction is a direction orthogonal to a conveyance direction of a sheet.

The image former 13 includes a stepping motor or the like (not illustrated) or the like for moving the photoreceptors in the main scanning direction.

The image former 13 uniformly charges the photosensitive drum 131Y, and then scans and exposes it with a laser beam to form an electrostatic latent image on the basis of the image data of yellow. Next, the image former 13 causes a toner of yellow to adhere to the electrostatic latent image on the photosensitive drum 131Y to perform development.

The photosensitive drums 131M, 131C, and 131K work similarly to the photosensitive drum 131Y except that the respective colors are different, and thus the description thereof will be omitted.

The image former 13 sequentially transfers the toner images in the respective colors formed on the photosensitive drums 131Y, 131M, 131C, and 131K by the intermediate transfer unit 132 (primary transfer).

The intermediate transfer unit 132 includes an intermediate transfer belt 132*a* (intermediate transfer member) formed in an endless shape. The intermediate transfer belt 132*a* is rotated by a drive motor (not illustrated) in a direction opposite to the rotation direction of the photosensitive drums 131Y, 131M, 131C, and 131K.

The intermediate transfer unit 132 includes primary transfer parts (not illustrated) at positions facing the photosensitive drums 131Y, 131M, 131C, and 131K in the intermediate transfer belt 132*a*. The image former 13 applies a polarity opposite to that of the toners to the intermediate transfer belt 132*a*, thereby transferring the toner images formed on the photosensitive drums 131Y, 131M, 131C, and 131K to the intermediate transfer belt 132*a*.

That is, the image former 13 forms, on the intermediate transfer belt 132*a*, a color toner image in which the toner images of four colors are superimposed.

The intermediate transfer unit 132 and the intermediate transfer belt 132*a* are held in the image forming apparatus 10 so as to be movable from predetermined positions in the main scanning direction of the image.

The image former 13 includes a stepping motor or the like (not illustrated) for moving the intermediate transfer unit 132 or the intermediate transfer belt 132*a* in the main scanning direction.

The image former 13 collectively transfers the color toner images on the intermediate transfer belt 132*a* onto a sheet by the secondary transfer unit 133 (secondary transfer).

The secondary transfer unit 133 includes a secondary transfer roller 133*a* (secondary transfer member) that presses the sheet conveyed from the sheet feeder 16 toward the intermediate transfer belt 132*a*.

The secondary transfer unit 133 and the secondary transfer roller 133*a* are held in the image forming apparatus 10 so as to be movable from a predetermined position in the main scanning direction of the image.

The image former 13 includes a stepping motor or the like (not illustrated) for moving the secondary transfer unit 133 or the secondary transfer roller 133*a* in the main scanning direction.

The fixing unit 134 heats and pressurizes, at a fixing nip, the sheet on which the toner images have been transferred, thereby fixing the toner images on the sheet.

The fixing unit 134 includes a heating roller 134*a*, an upper pressure roller 134*b*, a fixing belt 134*c* (fixing member), and a lower pressure roller 134*d*.

The heating roller 134*a* includes a heating source therein.

The fixing belt 134*c* is an endless belt stretched between the heating roller 134*a* and the upper pressure roller 134*b*.

The upper pressure roller 134*b* and the lower pressure roller 134*d* are rotated by driving of a motor (not illustrated).

The heating roller 134*a* and the fixing belt 134*c* rotate following the upper pressure roller 134*b*.

The upper pressure roller 134*b* and the lower pressure roller 134*d* are brought into pressure contact with each other via the fixing belt 134*c* to form a fixing nip that nips and conveys a sheet.

The fixing unit 134 causes a sheet to pass between the fixing belt 134*c* in a state of being heated by the heating source and the fixing nip formed by the lower pressure roller 134*d*. The fixing unit 134 fixes the toner images to the sheet by heating and pressing the sheet.

The fixing unit 134 and the fixing belt 134*c* are held in the image forming apparatus 10 so as to be movable from predetermined positions in the main scanning direction of the image.

The image former 13 includes a stepping motor or the like (not illustrated) for moving the fixing unit 134 or the fixing belt 134*c* in the main scanning direction.

Hereinafter, each of the photoreceptors, the intermediate transfer unit 132, the intermediate transfer member, the secondary transfer unit 133, the secondary transfer member, the fixing unit 134, and the fixing member is also referred to as an object.

The object is an element included in the image former 13 that forms an image on a sheet (recording medium), and moves in a main scanning direction during an operation (image forming operation) related to image formation based on a print job.

In the case of single-sided printing in which an image is formed on one side of a sheet in the image forming apparatus 10, the controller 11 conveys the sheet from the fixing unit 134 to the output-image reader 14.

On the other hand, in the case of double-sided printing in which images are formed on both sides of a sheet, the controller 11 conveys the sheet from the fixing unit 134 to the reversing path 135 and reverses the side of the sheet. Next, the controller 11 feeds the sheet again to the upstream side in the sheet conveyance direction of the register 136.

The register 136 includes a registration roller and conveys the sheet to a transfer part.

The register 136 corrects the inclination of the sheet conveyed from the sheet feeder 16 and adjusts the conveyance timing of the sheet.

The output-image reader 14 is provided downstream from the image former 13 on a sheet conveyance path.

The output-image reader 14 reads a printed sheet on which an image is formed on the sheet by the image former 13 and generates read image data. The output-image reader 14 outputs a reading result (read image data) to the controller 11.

The output-image reader 14 is a color sensor that receives, with light receiving elements, light emitted from a light source and reflected by the surface of the sheet, and outputs red, green, and blue signals corresponding to the intensity of the light. The output-image reader 14 includes, for example, a line sensor in which a plurality of light receiving elements are arranged at predetermined intervals in the sheet width direction orthogonal to the sheet conveyance direction.

The communicator 15 transmits and receives data to and from an external device such as a personal computer (PC) connected through a communication network such as a local area network (LAN). The communicator 15 receives, for example, a job including image data for printing from the external device.

The sheet feeder 16 includes a sheet feed tray T1 and feeds a sheet from the sheet feed tray T1 to the image former 13. Each sheet feed tray T1 stores sheets with a sheet type, a size, and the like predetermined for each sheet feed tray T1.

The conveyor 17 is a conveyance mechanism for a sheet. The conveyor 17 includes a plurality of roller pairs and conveys the sheet fed from the sheet feeder 16 to the image former 13. Next, the conveyor 17 conveys the sheet that has passed through the image former 13 to the output-image reader 14. Next, the conveyor 17 ejects the sheet that has passed through the output-image reader 14 to a sheet ejection tray T2.

The document reader 18 includes an automatic document feeder (ADF), a scanner and the like.

The document reader 18 outputs image data obtained by reading the image of the document to the controller 11.

The storage 19 includes, for example, a nonvolatile semiconductor memory (a flash memory or the like), a hard disk drive, or the like.

The storage 19 stores input document data, various kinds of setting information, image data, and the like. These pieces of data and the like may be stored in the RAM of the controller 11.

The driver 20 drives a stepping motor or the like that moves each of the above-described objects in the main scanning direction of the image.

2. Vertical Streak-Like Image Defect

A vertical streak-like image defect (density unevenness, gloss unevenness, or the like) along a sub-scanning direction may occur in an image formed on a sheet by the image former 13 of the image forming apparatus 10. Hereinafter, the vertical streak-like image defect is referred to as a vertical streak.

The defect in the above-described object may cause the vertical streak.

After the toner image is primarily transferred from each photoreceptor to the intermediate transfer belt 132*a*, the image former 13 removes the toner remaining on the photoreceptor by a cleaning blade (not illustrated). At this time, when the photoreceptor is damaged by unintended contact with another member, foreign matter entrapped in the cleaning blade, or the like, the toner does not adhere to the damaged portion of the photoreceptor. Thus, whitish streak-like density unevenness occurs along the sub-scanning direction of the image.

After the toner images are secondarily transferred from the intermediate transfer belt 132*a* onto the sheet, the intermediate transfer unit 132 removes the toners remaining on the intermediate transfer belt 132*a* with a cleaning blade (not illustrated). At this time, when damage is generated on the circumference of the intermediate transfer belt 132*a* due to unintended contact with another member, foreign matter, or the like, streak-like density unevenness occurs along the sub-scanning direction of the image.

The secondary transfer unit 133 transfers the toner images from the intermediate transfer belt 132*a* to a sheet by the secondary transfer roller 133*a*, and then removes the toners remaining on the secondary transfer roller 133*a* by a cleaning blade (not illustrated). At this time, when foreign matter adheres to the secondary transfer roller 133*a*, transfer unevenness occurs, and streak-like density unevenness occurs along the sub-scanning direction of the image.

A case will be described where in the fixing unit 134, damage is generated on the circumference of the fixing belt 134*c* due to contact with an edge of a small-sized sheet (e.g., a postcard). In this case, thereafter when a sheet having a large size (e.g., A3 wide sheet) passes through the fixing belt 134*c*, fixing unevenness occurs. Due to the fixing unevenness, streak-like density unevenness occurs along the sub-scanning direction of the image.

3. Operation of Image Forming Apparatus

Next, the operation of the image forming apparatus 10 according to the present embodiment will be described.

(3-1. Swinging and Steering Operation)

The controller 11 causes the above-described objects to be swung or perform a steering operation during image formation by the image former 13. To be specific, the controller 11 causes the photoreceptors, the entire intermediate transfer unit 132, the entire secondary transfer unit 133, and/or the entire fixing unit 134 to be swung during the image formation. The controller 11 causes the intermediate transfer belt 132*a*, the secondary transfer roller 133*a*, and/or the fixing belt 134*c* to perform a steering operation during the image formation.

The controller 11 causes each photoreceptor to be swung, thereby reducing the occurrence of damage to the photoreceptor when the residual toner on the photoreceptor is removed with the cleaning blade.

The controller 11 causes the entire intermediate transfer unit 132 to be swung, or causes the intermediate transfer belt 132*a* to perform a steering operation. Thus, the controller 11 reduces the occurrence of damage to the intermediate transfer belt 132*a* when removing the residual toner on the intermediate transfer belt 132*a* with the cleaning blade.

The controller 11 causes the entire secondary transfer unit 133 to be swung or causes the secondary transfer roller 133*a* to perform a steering operation. Thus, the controller 11 reduces the adhesion of foreign matter to the secondary transfer roller 133*a* and the occurrence of damage to the secondary transfer roller 133*a* when removing the residual toner on the secondary transfer roller 133*a* with the cleaning blade.

The controller 11 causes the entire fixing unit 134 to be swung or causes the fixing belt 134*c* to perform a steering operation. Thus, the controller 11 reduces the occurrence of damage on the circumference of the fixing belt 134*c* due to contact with an edge of a sheet having a small size (e.g., a postcard).

(3-2. Determination Processing)

Next, determination processing that is executed by the image forming apparatus 10 during execution of a print job will be described.

The controller 11 executes the determination processing in cooperation with a program stored in the storage 19.

The controller 11 executes the determination processing, for example, when job information of a print job is received from an external device or the like via the communicator 15. The external device is, for example, a personal computer.

Figure 3:
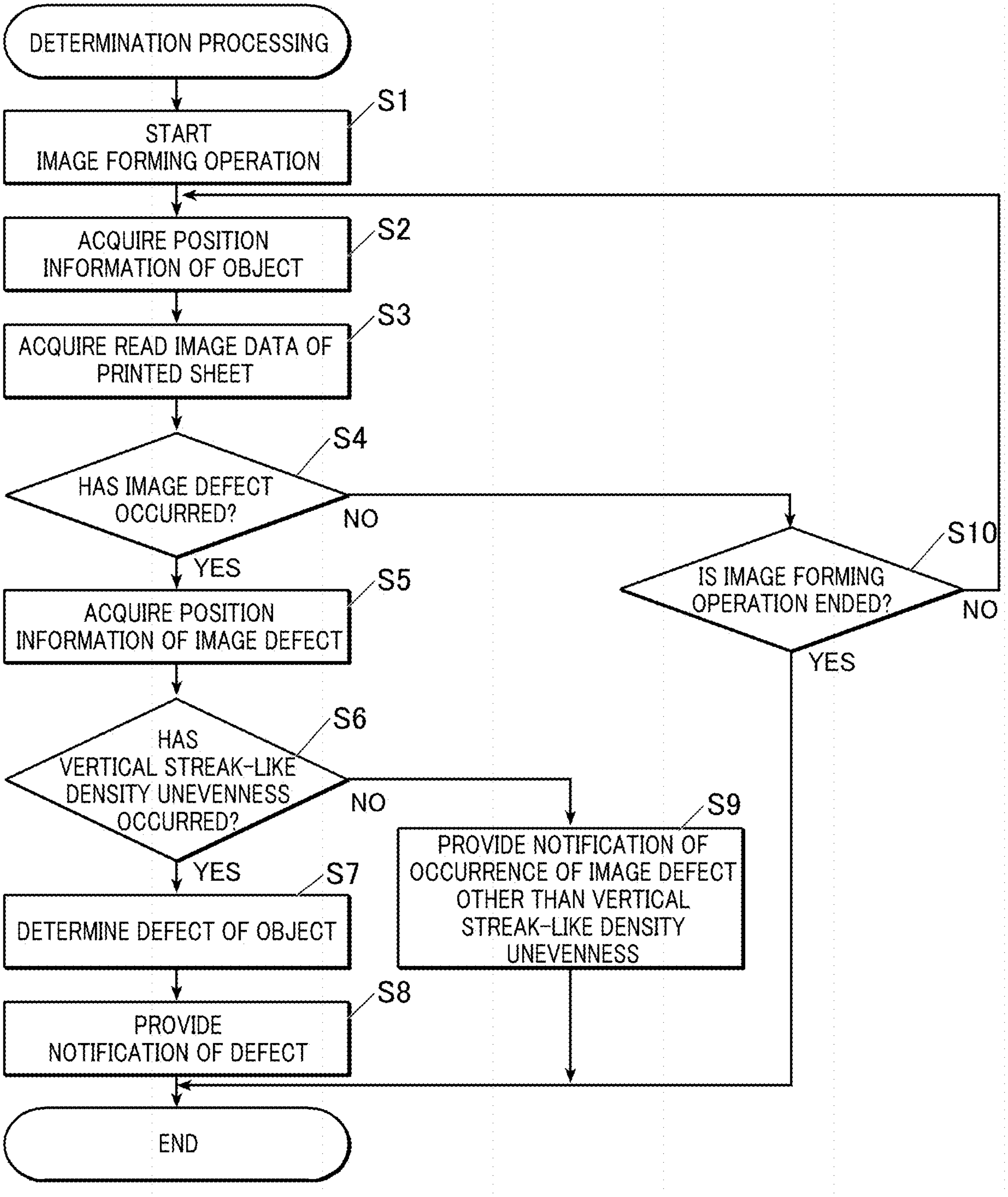
FIG. 3 is a flowchart illustrating a flow of determination processing.

FIG. 3 illustrates a flowchart of the determination processing.

The controller 11 executes a print job and starts an image forming operation by the image former 13 (Step S1). In Step S1, the controller 11 starts the swinging or steering operation for moving each object in the main scanning direction.

Next, the controller 11 acquires position information of each object in the main scanning direction during the image forming operation (Step S2).

That is, the controller 11 acquires the position information of the object in the main scanning direction during the operation related to the image formation. The controller 11 functions as an acquirer.

In Step S2, for example, the controller 11 acquires the position information of the objects from the position detection sensors that detect the positions of the respective objects. Alternatively, the controller 11 may acquire position information from a movement command signal for moving each object.

Next, the controller 11 causes the output-image reader 14 to read the side of the sheet on which the image has been formed by the image forming operation of the image former 13, and acquires the read image data (Step S3).

That is, the output-image reader 14 reads the image on the sheet (recording medium) formed by the operation related to the image formation. The output-image reader 14 functions as a reader.

Next, the controller 11 compares the input image of the print job with the read image acquired in Step S3. Next, the controller 11 determines whether there is an image difference between the input image and the read image, that is, whether an image defect has occurred (Step S4). A portion having an image difference between the input image and the read image is a portion of interest in the read image.

A case will be described where the controller 11 outputs an image predetermined by an image forming operation of the image former 13. In this case, in Step S4, the controller 11 may determine whether an image defect has occurred on the basis of the predetermined image and the read image. In this case, a portion having an image difference between the predetermined image and the read image is a portion of interest in the read image.

Figure 4:
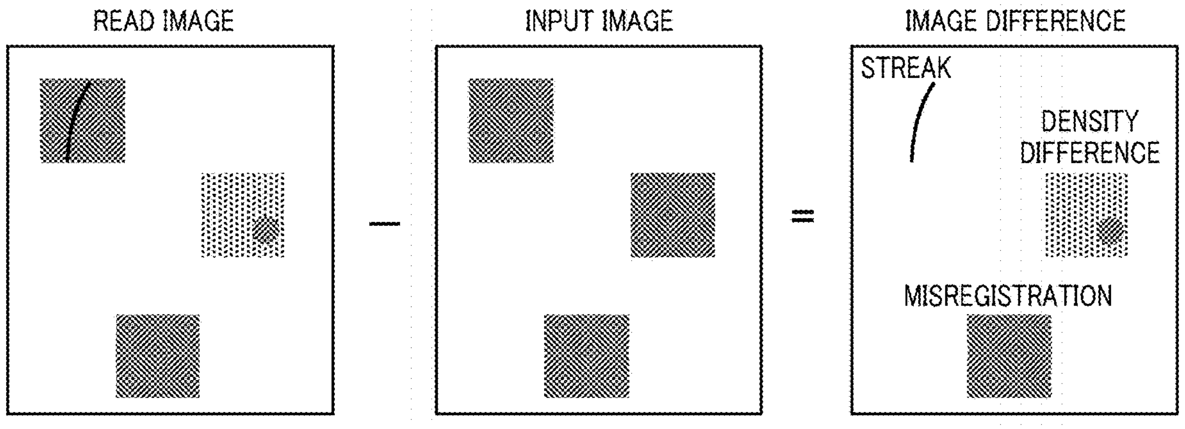
FIG. 4 is a diagram illustrating an example of image differences between an input image and a read image.

FIG. 4 illustrates an example of image differences between the input image and the read image.

As illustrated in FIG. 4, the controller 11 subtracts the input image from the read image to acquire image differences between the input image and the read image.

In the example illustrated in FIG. 4, the image differences are a streak, a density difference, and misregistration.

The density difference and the misregistration illustrated in FIG. 4 may include an image difference that is not a defect.

The controller 11 excludes a density difference that is not a defect from the density differences illustrated in FIG. 4.

Figure 5A:
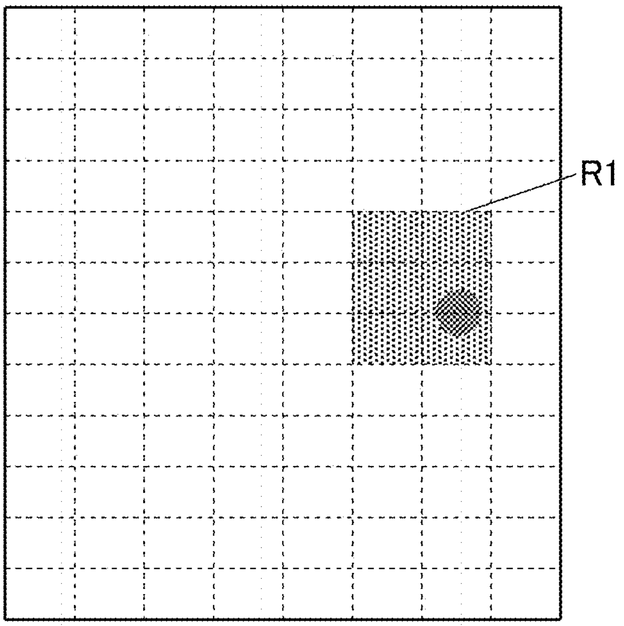
FIG. 5A is a diagram illustrating an example of a density difference between an input image and a read image.

To be specific, the controller 11 divides an image region in the read image as illustrated in FIG. 5A, and calculates an average density of a region R1 where the density difference is detected. Next, the controller 11 subtracts the calculated average density portion from the region R1 where the density difference is detected.

Figure 5B:
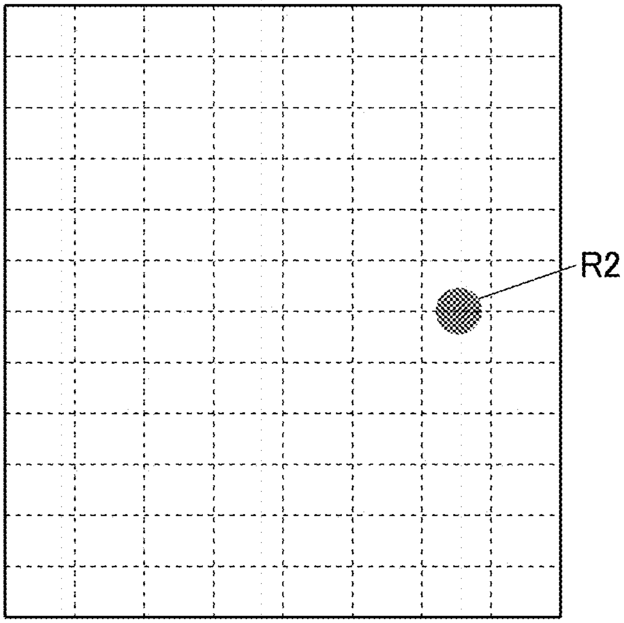
FIG. 5B is a diagram illustrating an example of the density difference after correction.

FIG. 5B illustrates a region R2 obtained by subtracting the calculated average density portion from the region R1 where the density difference is detected.

The controller 11 determines the region R2 to be a region where a density difference that is a defect is detected.

When the misregistration illustrated in FIG. 4 has occurred in the entire read image, the controller 11 corrects the misregistration in the read image. Next, the controller 11 compares the input image with the corrected read image, thereby excluding the misregistration that is not a defect.

Returning to FIG. 3, if an image defect has occurred (Step S4; YES), the controller 11 acquires position information of the image difference between the input image and the read image in the main scanning direction (Step S5).

Figure 6:
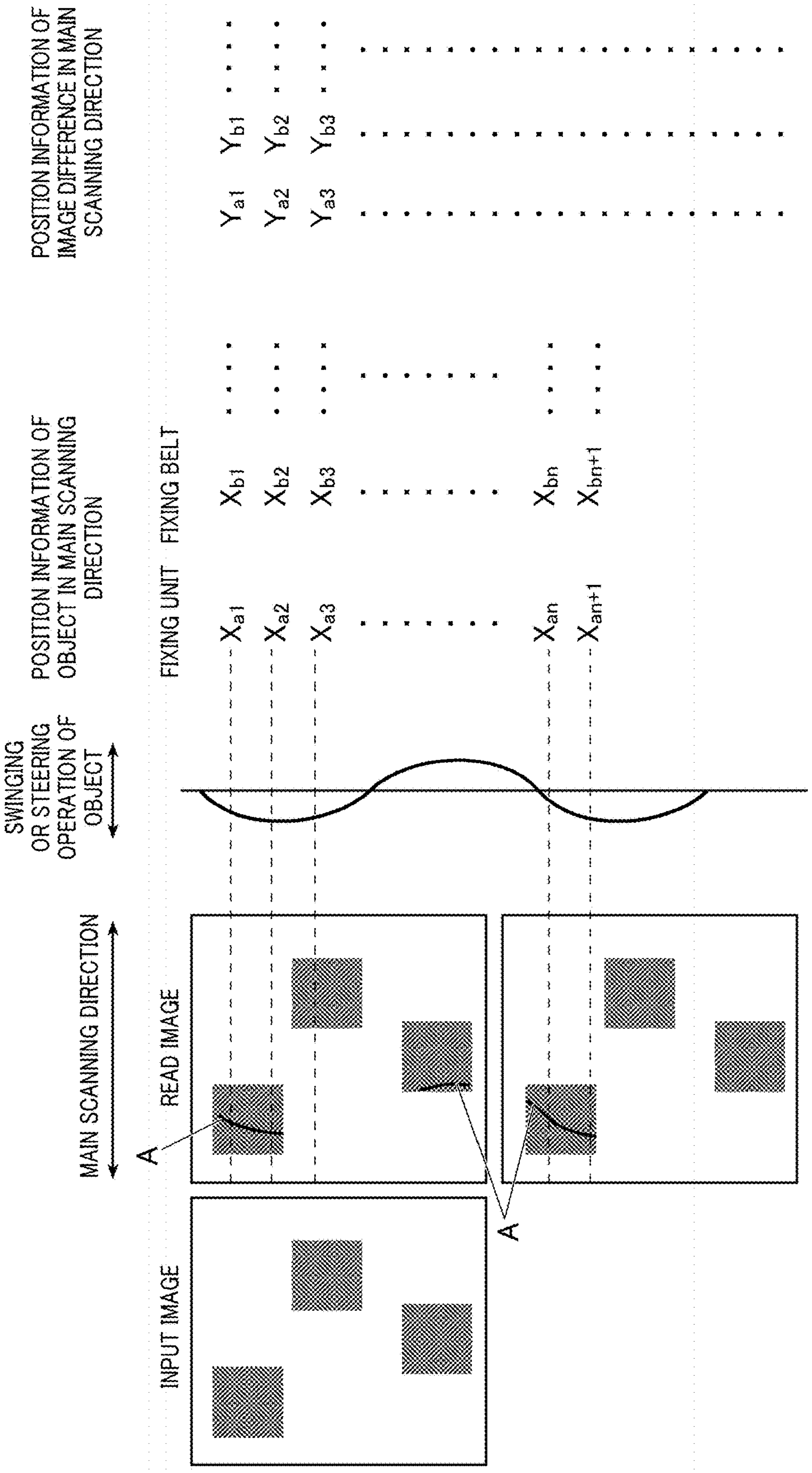
FIG. 6 is a diagram illustrating an example of position information of each object in the main scanning direction and position information of each image difference in the main scanning direction.

FIG. 6 illustrates an example of the position information of each object in the main scanning direction acquired by the controller 11 in Step S2 and the position information of each image difference in the main scanning direction acquired in Step S5.

In the example illustrated in FIG. 6, vertical streaks A have occurred in the read image. The Ya1 . . . in the position information of the image differences indicate position information of the vertical streaks A in the main scanning direction. The Yb1 . . . in the position information of the image differences indicate position information of image defects other than the vertical streaks A in the main scanning direction.

Next, the controller 11 determines whether a vertical streak has occurred in the image defect determined in Step S4 (Step S6). The vertical streak is a streak-like density unevenness along the sub-scanning direction in an image on a sheet. The vertical streak is blackish streak-like density unevenness in which the toner density is higher than that of an adjacent portion or whitish streak-like density unevenness in which the toner density is lower than that of an adjacent portion.

If a vertical streak has occurred (Step S6; YES), the controller 11 specifies an object causing the vertical streak. Next, the controller 11 determines that the specified object has an defect (Step S7).

In Step S7, the controller 11 specifies, among the pieces of position information of the objects in the main scanning direction, position information correlated with the position information of the vertical streak in the main scanning direction. Next, the controller 11 specifies the object indicating the specified position information as the object causing the vertical streak.

For example, when a correlation coefficient between the position information of the object in the main scanning direction and the position information of the vertical streak in the main scanning direction is equal to or greater than 97%, the controller 11 determines that there is a correlation. The threshold in the correlation coefficient is not limited thereto and may be defined for each type of image difference (image defect).

Figure 7:
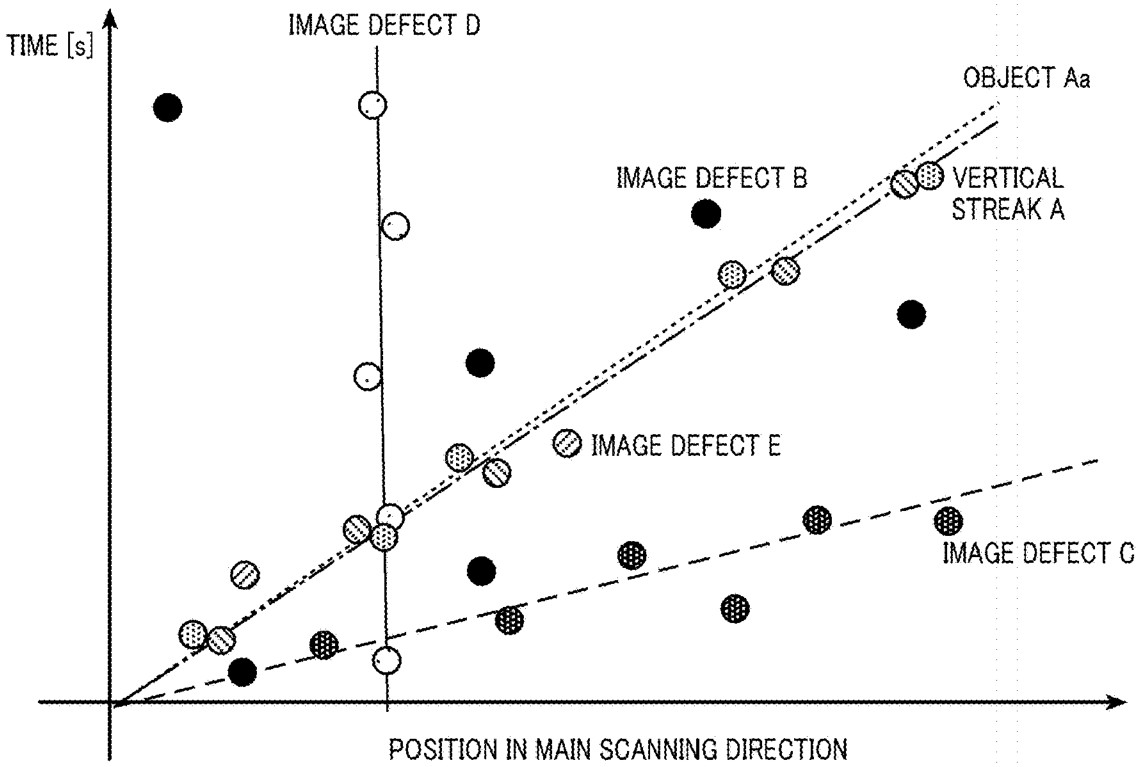
FIG. 7 is a diagram illustrating an example of a relationship between time and position information of an object in the main scanning direction, position information of each image difference in the main scanning direction.

FIG. 7 illustrates an example of the relationship between the position information of an object Aa in the main scanning direction, the position information of each image difference in the main scanning direction, and time, during the image forming operation. In the example illustrated in FIG. 7, the image differences are a vertical streak A and image defects B to E.

Figure 8:
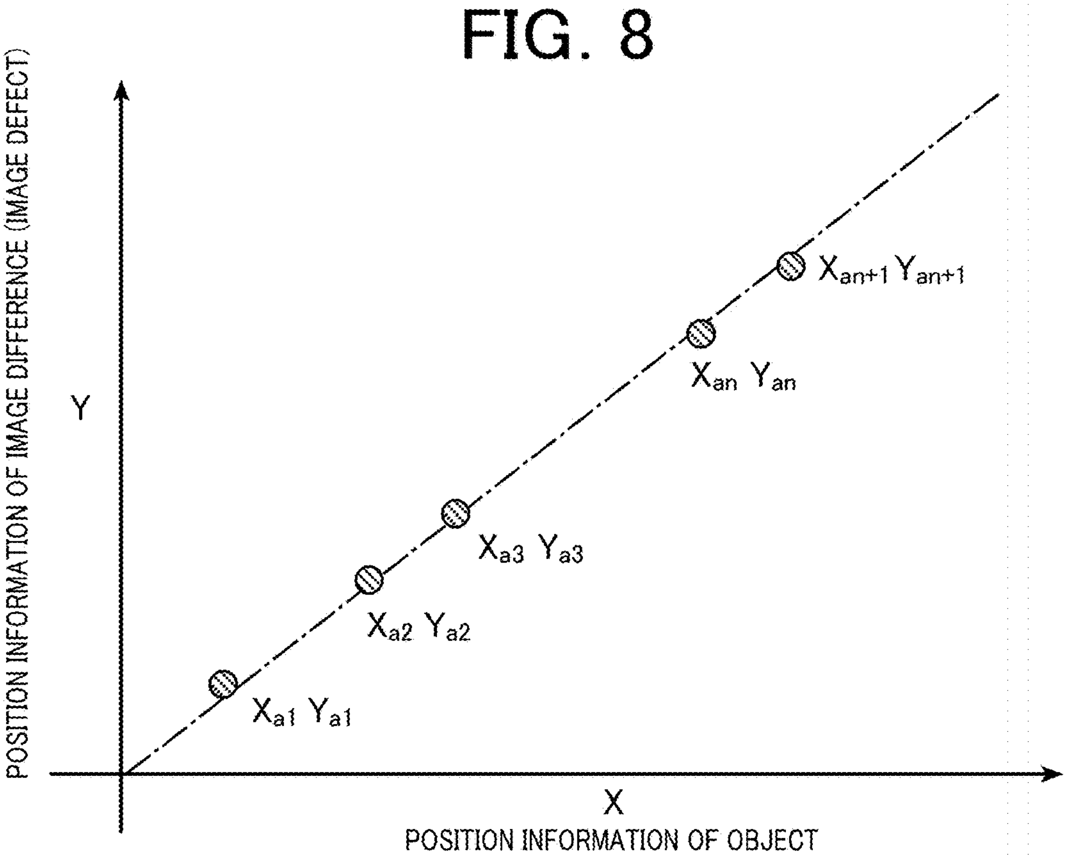
FIG. 8 is a diagram illustrating an example of a relationship between the position information of the object in the main scanning direction and the position information of an image defect in the main scanning direction.

FIG. 8 illustrates an example of the relationship between the position information of the object Aa in the main scanning direction and the position information of the vertical streak A in the main scanning direction, during the image forming operation. In the example illustrated in FIGS. 7 and 8, the object Aa is the fixing unit 134.

A case will be described where a correlation coefficient between the position information of the vertical streak A in the main scanning direction and the position information of the object Aa (fixing unit 134) in the main scanning direction during the image forming operation is equal to or greater than 97%. In this case, the controller 11 determines that there is a correlation between the position information of the vertical streak A in the main scanning direction and the position information of the object Aa (fixing unit 134) in the main scanning direction. That is, the controller 11 specifies that an object causing the vertical streak A is the target object Aa (fixing unit 134).

In Step S7, regarding the image difference (image defect) in which the score of the acquired position information in the main scanning direction is three or lower, the controller 11 may not specify the object causing the image defect. The threshold for the score of the position information of the image difference (image defect) is not limited thereto and may be determined for each type of the image difference (image defect).

In Step S7, the controller 11 determines the state of the object on the basis of the position information of the object in the main scanning direction that is acquired as the acquirer and the read image data read by the output-image reader 14. The controller 11 functions as a determiner.

The state of the object is determined as to whether the object is defective and causes the image defect.

The position information of each object in the main scanning direction during the image forming operation that is acquired by the controller 11 in Step S2 includes a movement amount of the object in the main scanning direction during the image forming operation.

The position information of the image difference in the main scanning direction between the input image and the read image that is acquired by the controller 11 in Step S5 includes a movement amount of the image difference in the main scanning direction between the read image and the input image during the image forming operation.

That is, the controller 11 functioning as the determiner determines the state of the object on the basis of the movement amount of the object in the main scanning direction during the operation related to the image formation and the movement amount of the portion of interest in the read image in the main scanning direction during the operation.

The position information of each object in the main scanning direction during the image forming operation that is acquired by the controller 11 in Step S2 includes a moving direction of the object in the main scanning direction during the image forming operation.

The position information of the image difference in the main scanning direction between the input image and the read image that is acquired by the controller 11 in Step S5 includes the moving direction of the image difference in the main scanning direction between the read image and the input image during the image forming operation.

That is, the controller 11 functioning as the determiner determines the state of the object on the basis of the moving direction of the object in the main scanning direction during the operation related to the image formation and the moving direction of the portion of interest in the read image in the main scanning direction during the operation.

The controller 11 functioning as the determiner determines that the object is defective in a case where a correlation coefficient between the movement amount of the object in the main scanning direction during the image forming operation and the movement amount of the portion of interest in the read image in the main scanning direction during the image forming operation is equal to or greater than a predetermined value (for example, 97%).

The controller 11 functioning as the determiner determines that the object is defective in a case where the moving direction of the object in the main scanning direction during the image forming operation and the moving direction of the portion of interest in the read image in the main scanning direction during the image forming operation are the same, that is, correspond to the right direction or the left direction.

Next, the controller 11 causes the display 12*a* to display a message to prompt the user to replace the object determined to be defective in Step S7 (Step S8), and ends the present process.

When the object determined to be defective is the fixing unit 134, the controller 11 causes the following message to be displayed in Step S8. To be specific, the message is "please replace the fixing unit because the image defect is caused by the fixing unit" or the like.

That is, the controller 11 notifies the user of the object determined to be defective by the determiner. The controller 11 functions as a notifier.

The controller 11 functioning as the notifier prompts the user to replace the object determined to be defective.

This is a case where no vertical streak occur (Step S6; NO), that is, a case where the image defect other than the vertical streak has occurred. In this case, the controller 11 causes the display 12*a* to display a message indicating that an image defect other than a vertical streak has occurred (Step S9), and ends the present process.

If no image defect occurs (Step S4; NO), the controller 11 determines whether to end the image forming operation by the image former 13 (Step S10).

If the image forming operation is not ended (Step S10; NO), the controller 11 shifts the present process to Step S2.

If the image forming operation is ended (Step S10; YES), the controller 11 ends the present process.

In the above-described embodiment, a case will be described where the controller 11 causes a plurality of units to be swung during image formation. The plurality of units are any two or more of the photoreceptors, the intermediate transfer unit 132, the secondary transfer unit 133 and the fixing unit 134.

In this case, the controller 11 makes the moving directions and/or the movement amounts in the swing of respective units different from each other before executing the above-described determination processing. This makes it possible to prevent the position information of each unit in the main scanning direction that is acquired in Step S2 of the above-described determination processing from being the same. That is, only one object can be specified as the object causing the image defect.

In other words, the controller 11 makes the moving directions or the movement amounts of respective objects in the main scanning direction different from each other.

4. Modification Example

Next, an image forming apparatus 10 of a modification example of the above-described embodiment will be described. The differences from the above-described embodiment will be mainly described below.

The image forming apparatus 10 of the present modification example has the same configuration as the image forming apparatus 10 of the above-described embodiment.

Figure 9:
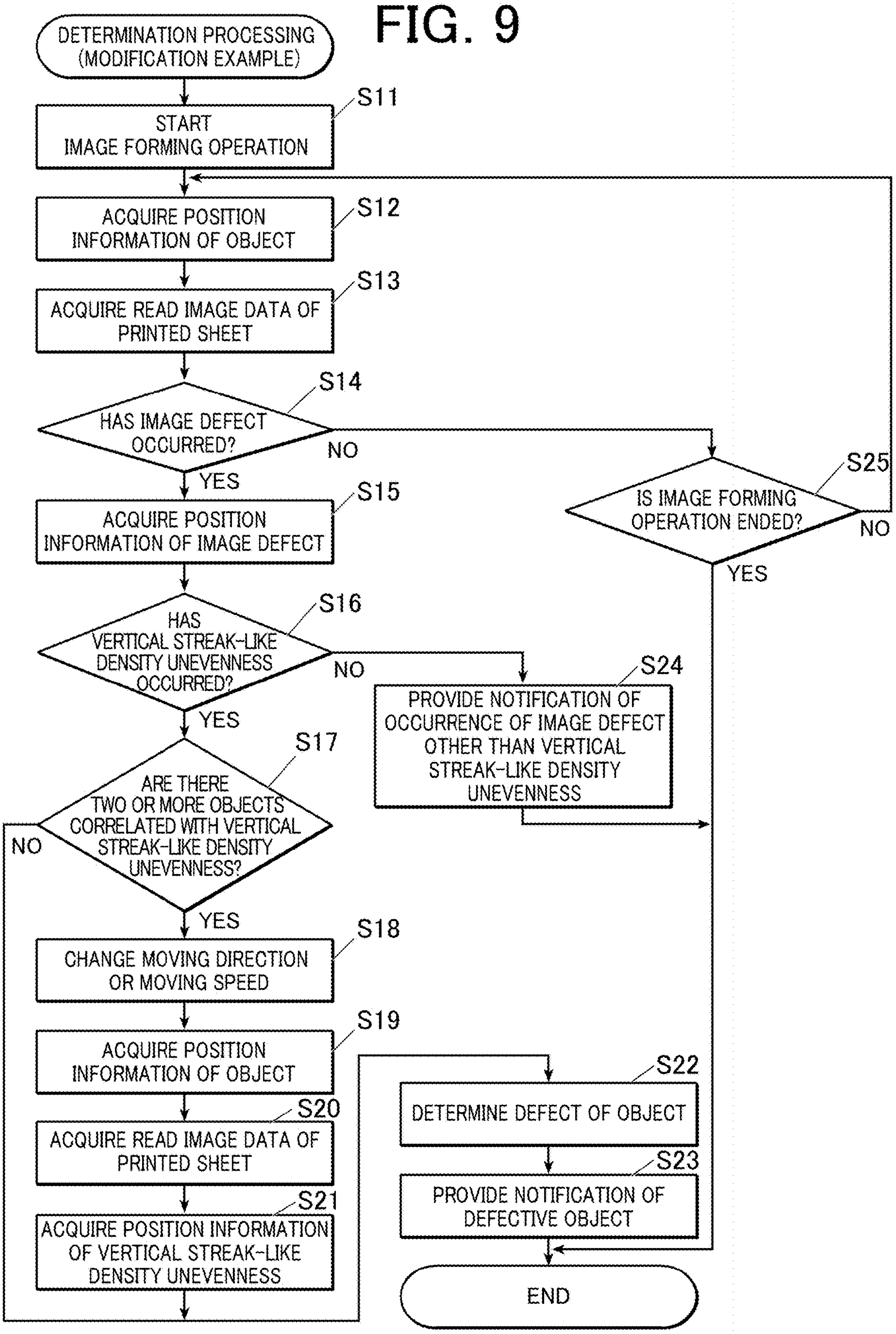
FIG. 9 is a flowchart illustrating a flow of determination processing of a modification example.

FIG. 9 illustrates a flowchart of determination processing of the present modification example.

For example, when causing an intermediate transfer belt 132*a*, a secondary transfer roller 133*a*, and/or a fixing belt 134*c* to perform a steering operation during image formation, the controller 11 executes the determination processing of the present modification example.

In the present modification example, the controller 11 performs Steps S11 to S16 similarly to the determination processing Steps S1 to S6 of the above-described embodiment.

A case where a vertical streak has occurred (Step S16; YES) will be described. In this case, the controller 11 determines whether there are two or more pieces of position information of the object in the main scanning direction, the position information being correlated with the position information of the vertical streak in the main scanning direction. That is, the controller 11 determines whether there are two or more objects which are candidates causing the vertical streak (Step S17).

In Step S17, for example, the controller 11 determines whether there are two or more pieces of position information of the object in the main scanning direction for which the correlation coefficient with the position information of the vertical streak in the main scanning direction is equal to or greater than 97%.

Figure 10:
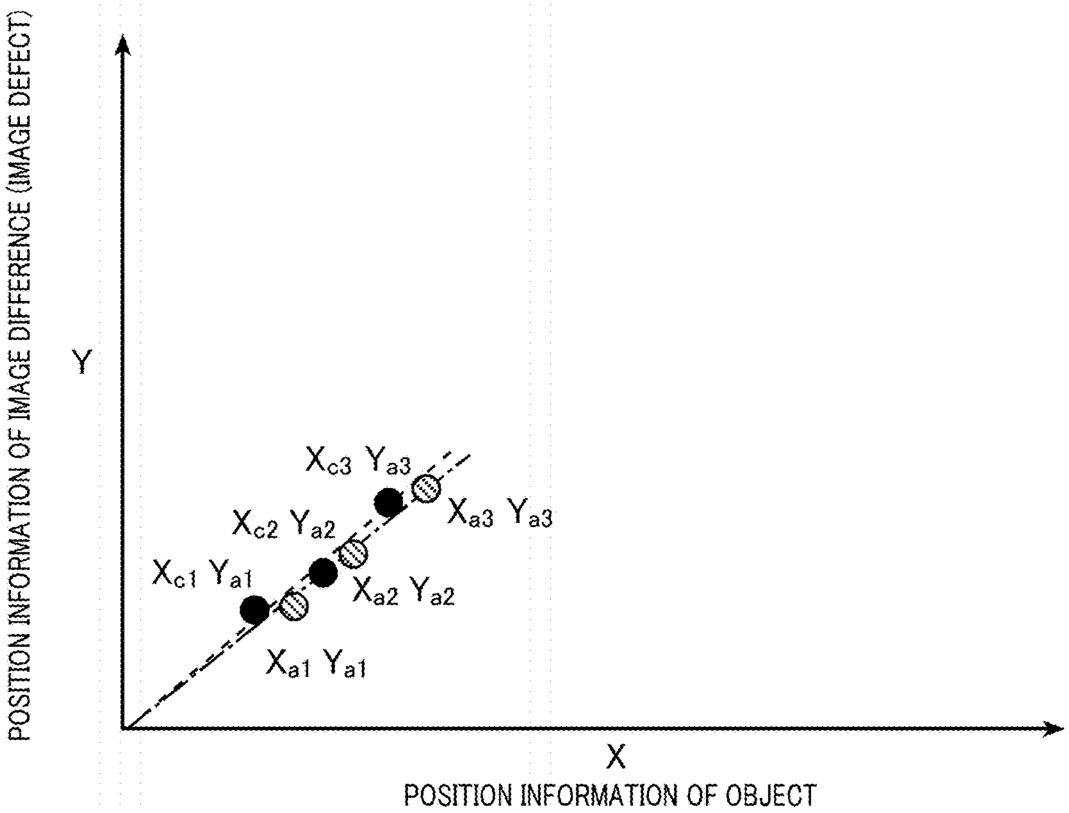
FIG. 10 is a diagram illustrating an example of a relationship between position information of an object in the main scanning direction and position information of an image defect in the main scanning direction according to a modification example.

FIG. 10 illustrates a case where there are two pieces of position information of the object in the main scanning direction correlated with the position information of the vertical streak in the main scanning direction.

In the example illustrated in FIG. 10, the position information Ya1 to Ya3 of the vertical streak A in the main scanning direction is correlated with the position information Xa1 to Xa3 of the fixing unit 134 in the main scanning direction. The position information Ya1 to Ya3 of the vertical streak A in the main scanning direction is correlated with the position information Xc1 to Xc3 of the intermediate transfer belt 132*a* in the main scanning direction.

A case where there are two or more objects which are candidates causing the vertical streak (Step S17; YES) will be described. In this case, the controller 11 changes the moving direction or the moving speed in the swinging or steering operation of any one of the objects which are candidates causing the vertical streak (Step S18).

A case will be described where, in Step S18, the controller 11 changes the moving direction in the swinging or steering operation of any one of the objects which are candidates causing the vertical streak.

In Step S18, the controller 11 determines the object whose moving direction is to be changed, on the basis of the margin of the movable position in the swinging or steering operation of the objects which are candidates causing the vertical streak.

Figure 11:
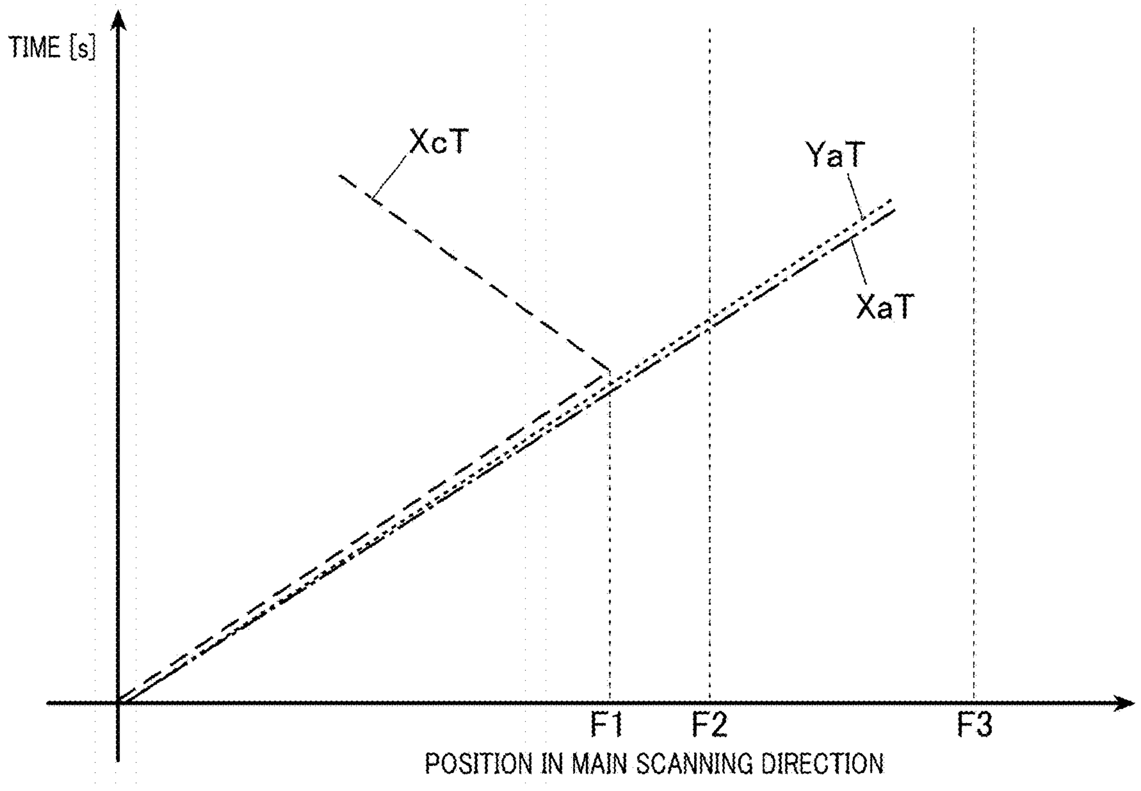
FIG. 11 is a diagram illustrating an example of a movable position in the swinging or steering operation of the object in the main scanning direction.

FIG. 11 illustrates a relationship XaT between the position information of the fixing unit 134 in the main scanning direction and time. FIG. 11 illustrates a relationship XcT between the position information of the intermediate transfer belt 132*a* in the main scanning direction and time. FIG. 11 illustrates a relationship YaT between the position information of the vertical streak in the main scanning direction and time.

The controller 11 changes, at a position F1 in the main scanning direction, the moving direction in the swinging or steering operation of any one of the objects which are candidates causing the vertical streak.

A position F2 in the main scanning direction indicates a movement limit position in the steering operation of the intermediate transfer belt 132*a*.

A position F3 in the main scanning direction indicates a movement limit position in the swinging of the fixing unit 134.

The maximum amount of movement in the swinging or steering operation of the object is within a sheet passing range.

The controller 11 changes the moving direction of the object having a shorter distance from the position F1 to the movement limit position in the swinging or steering operation. In this case, the position F2 is closer to the position F1 than the position F3, that is, the position F2 has a smaller margin from the position F1 than the position F3. Therefore, the controller 11 changes the moving direction in the steering operation of the intermediate transfer belt 132*a*.

Next, a case will be described where, in Step S18, the controller 11 changes the moving speed in the swinging or steering operation of any one of the objects which are candidates causing the vertical streak.

In Step S18, the controller 11 determines the object whose moving speed is to be changed, on the basis of the margin of the movable position in the swinging or steering operation of the objects which are candidates causing the vertical streak.

Figure 12:
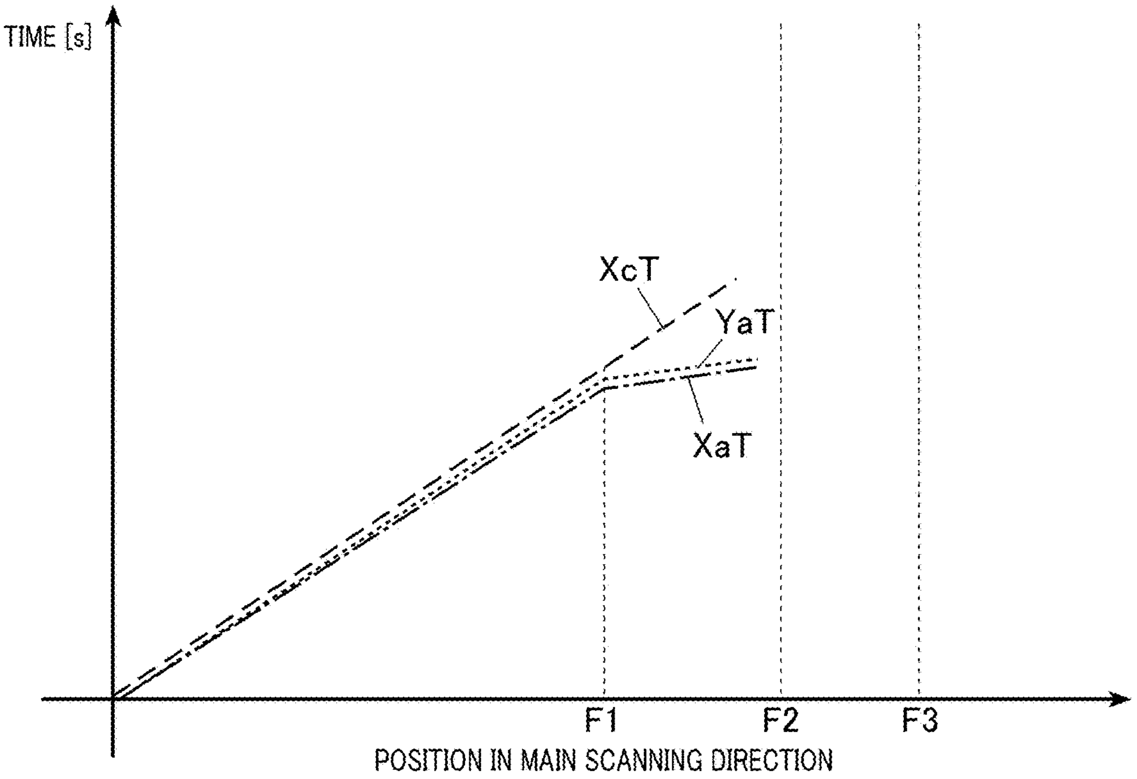
FIG. 12 is a diagram illustrating an example of a movable position in the swinging or steering operation of the object in the main scanning direction.

FIG. 12 illustrates a relationship XaT between the position information of the fixing unit 134 in the main scanning direction and time. FIG. 12 illustrates a relationship XcT between the position information of the intermediate transfer belt 132*a* in the main scanning direction and time. FIG. 12 illustrates a relationship YaT between the position information of the vertical streak in the main scanning direction and time.

The controller 11 changes, at a position F1 in the main scanning direction, the moving speed in the swinging or steering operation of any one of the objects which are candidates causing the vertical streak.

The controller 11 increases the moving speed of the object from the current speed, the object having a longer distance from the position F1 to the movement limit position in the swinging or steering operation. In this case, the position F3 is farther from the position F1 than the position F2, that is, the position F3 has a greater margin from the position F1 than the position F2. Therefore, the controller 11 increases the moving speed in the swinging of the fixing unit 134 from the current speed.

When changing the moving speed in the swinging of the object, the controller 11 changes the speed of the motor or the like that drives the swinging of the object.

Alternatively, the controller 11 may decrease the moving speed of the object from the current speed, the object having a shorter distance from the position F1 to the movement limit position in the swing or steering operation. In this case, the controller 11 may decrease the moving speed in the steering operation of intermediate transfer belt 132*a* from the current speed.

When changing the moving speed in the steering operation of the object, the controller 11 changes the inclination angle of a steering roller.

In Step S18, the controller 11 makes the moving directions or the movement amounts of the two or more objects different from each other in the following cases. To be specific, this is a case where the correlation coefficients between the moving directions and movement amounts of the two or more objects in the main scanning direction during the image forming operation and the moving directions and movement amounts of the image differences in the main scanning direction between the read image and the input image during the image forming operation are equal to or greater than a predetermined value (e.g., 97%). This case is a case where there are two or more pieces of position information of the object in the main scanning direction correlated with the position information of each image difference in the main scanning direction between the read image and the input image.

That is, this is a case where there are two or more objects which are candidates causing the image differences (image defects) between the read image and the input image.

In Step S18, the controller 11 controls the moving speeds of the two or more objects to make the movement amounts of the two or more objects different from each other.

In Step S18, the controller 11 determines an object whose moving direction or movement amount is to be changed among the two or more objects on the basis of the movable distances of the two or more objects in the respective moving directions.

Next, the controller 11 performs Steps S19 and S20 similarly to Steps S12 and S13.

Next, the controller 11 acquires position information of the vertical streak in the main scanning direction among the image differences between the input image and the read image (Step S21).

Next, the controller 11 specifies, among the pieces of position information of the objects in the main scanning direction, position information correlated with the position information of the vertical streak in the main scanning direction. Next, the controller 11 specifies the object indicating the specified position information as the object causing the vertical streak. Next, the controller 11 determines that the specified object is defective (Step S22).

Figure 13:
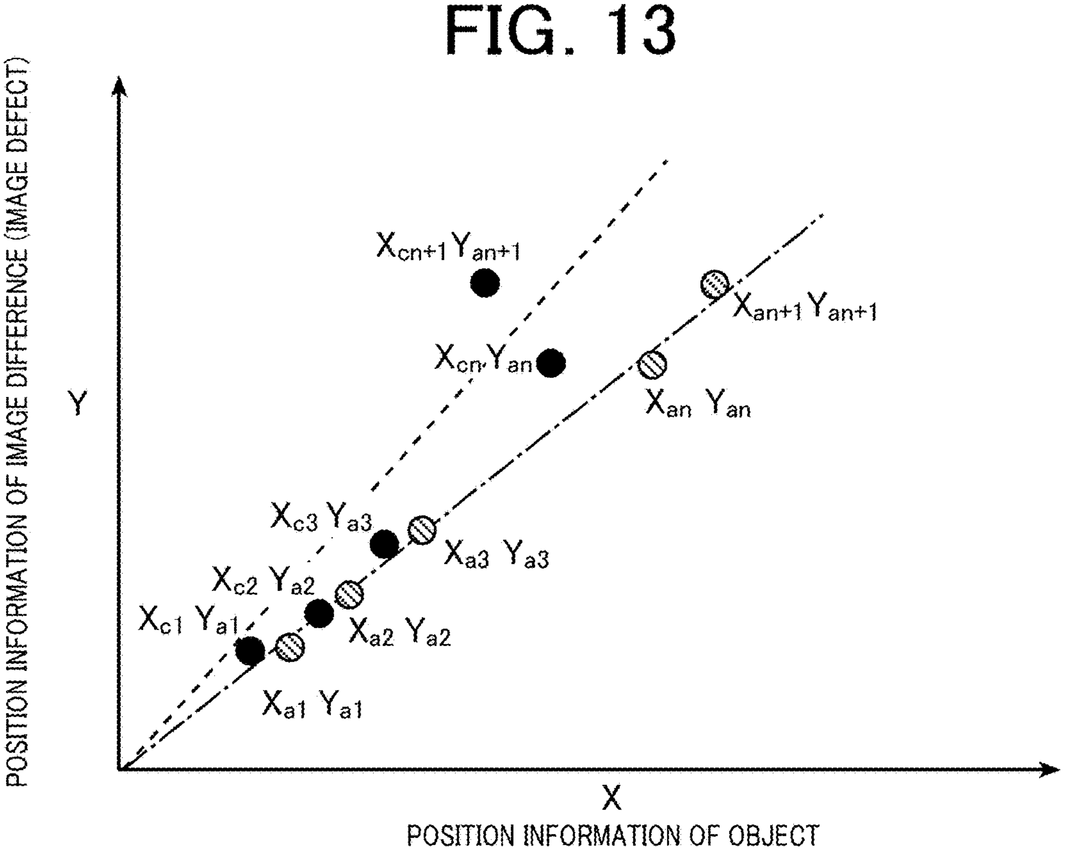
FIG. 13 is a diagram illustrating an example of a relationship between the position information of an object in the main scanning direction and the position information of an image defect in the main scanning direction according to the modification example.

FIG. 13 illustrates an example in which the moving direction in the steering operation of the intermediate transfer belt 132*a* is changed.

In the example illustrated in FIG. 13, the correlation coefficient between the position information Xcn to Xcn+1 of the intermediate transfer belt 132*a* in the main scanning direction after the change of the moving direction and the position information Yan to Yan+1 of the vertical streak A in the main scanning direction is less than 97%.

The correlation coefficient between the position information Xan to Xan+1 of the fixing unit 134 in the main scanning direction without changing the moving direction and the position information Yan to Yan+1 of the vertical streak A in the main scanning direction is equal to or greater than 97%.

In the example illustrated in FIG. 13, the controller 11 specifies that the object causing the vertical streak is the fixing unit 134.

Next, the controller 11 performs Step S23 similarly to the determination processing Step S8 of the above-described embodiment, and ends the present process.

If no vertical streak occurs (Step S16; NO), the controller 11 performs Step S24 similarly to the determination processing Step S9 of the above-described embodiment, and ends the present process.

If no image defect occurs (Step S14; NO), the controller 11 performs Step S25 similarly to the determination processing Step S10 of the above-described embodiment, and ends the present process.

In the above-described embodiment and modification example, the image forming apparatus 10 includes the output-image reader 14, but is not limited thereto. The controller 11 of the image forming apparatus 10 may acquire, from an external reading device communicable with the image forming apparatus 10, read image data obtained by reading an image on a sheet (recording medium) formed by an image forming operation. In this case, the image forming apparatus 10 and the external reading apparatus are included in the image forming system 1.

5. Effects

As described above, the image forming system 1 according to the present embodiment includes an object that is an element included in the image former 13 that forms an image on a recording medium (sheet) and that moves in a main scanning direction during an operation related to image formation based on a print job.

The image forming system 1 includes an acquirer (controller 11) that acquires position information of the object in the main scanning direction during an operation related to the image formation based on the print job.

The image forming system 1 includes a reader (output-image reader 14) that reads an image on the recording medium formed by an operation related to the image formation based on the print job.

The image forming system 1 includes a determiner (controller 11) that determines a state of the object on the basis of the position information acquired by the acquirer and the read image data read by the reader.

Thus, the state of the object can be determined during the image forming operation of the print job. That is, it is possible to reduce time and effort for determining the state of the object.

In the image forming system 1 according to the present embodiment, the determiner (controller 11) determines the state of the object on the basis of the movement amount of the object in the main scanning direction during the operation related to the image formation based on the print job and the movement amount of the portion of interest in the read image in the main scanning direction during the operation related to the image formation based on the print job.

Thus, the state of the object can be easily determined during the image forming operation of the print job.

In the image forming system 1 according to the present embodiment, the determiner (controller 11) determines the state of the object on the basis of the moving direction of the object in the main scanning direction during the operation related to the image formation based on the print job and the moving direction of the portion of interest in the read image in the main scanning direction during the operation related to the image formation based on the print job.

Thus, the state of the object can be easily determined during the image forming operation of the print job.

The image forming system 1 according to the present embodiment includes a plurality of objects and a controller 11 that makes the moving directions or the movement amounts of respective objects in the main scanning direction different from each other.

This makes it possible to prevent the position information of each unit in the main scanning direction that is acquired in Step S2 of the determination processing from being the same. That is, only one object can be specified as the object causing the image defect.

In the image forming system 1 according to the present embodiment, when correlation coefficients between the moving directions and movement amounts of two or more objects in the main scanning direction during the operation related to the image formation based on the print job and the moving directions and movement amounts of the portions of interest in the read image in the main scanning direction during the operation related to the image formation based on the print job are equal to or greater than the predetermined value, the controller 11 makes the moving directions or the movement amount of two or more objects different from each other.

The controller 11 controls the moving speeds of the two or more objects to make the movement amounts different from each other.

This makes it possible to prevent the correlation coefficients between the moving directions and the movement amounts of two or more objects in the main scanning direction during the image forming operation and the moving directions and the movement amounts of the portions of interest in the read image in the main scanning direction during the image forming operation from becoming equal to or greater than the predetermined value. That is, only one object can be specified as the object causing the image defect.

In the image forming system 1 according to the present embodiment, the controller 11 determines, on the basis of the movable distance of each of the two or more objects in the moving direction, the object whose moving direction or movement amount is to be changed among the two or more objects.

Thus, an object more appropriate for changing the moving direction or the movement amount can be determined on the basis of the distance from the position F1 where the moving direction or the movement amount is to be changed to the movement limit position.

In the image forming system 1 according to the present embodiment, the determiner (controller 11) determines that the object is defective in the following cases. To be specific, this is a case where the correlation coefficient between the movement amount of the object in the main scanning direction during the operation related to the image formation based on the print job and the movement amount of the portion of interest in the read image in the main scanning direction during the operation related to the image formation based on the print job is equal to or greater than the predetermined value.

Thus, the state of the object can be easily determined during the image forming operation of the print job.

In the image forming system 1 according to the present embodiment, the determiner (controller 11) determines that the object is defective in the following cases. To be specific, this is a case where the moving direction of the object in the main scanning direction during the operation related to the image formation based on the print job and the moving direction of the portion of interest in the read image in the main scanning direction during the operation related to the image formation based on the print job are the same, that is, correspond to the right direction or the left direction.

Thus, the state of the object can be easily determined during the image forming operation of the print job.

The image forming system 1 according to the present embodiment includes a notifier (controller 11) that notifies a user of the object determined to be defective by the determiner (controller 11).

Thus, the user can easily recognize that the object is defective.

In the image forming system 1 according to the present embodiment, the notifier (controller 11) prompts replacement of the object determined to be defective.

Thus, the user can easily recognize the needs to replace the defective object.

In the image forming system 1 according to the present embodiment, the object is at least one of the fixing unit 134, the fixing member (fixing belt 134*c*), the secondary transfer unit 133, the secondary transfer member (secondary transfer roller 133*a*), the intermediate transfer unit 132, the intermediate transfer member (intermediate transfer belt 132*a*), and the photoreceptors (photosensitive drums 131Y, 131M, 131C, and 131K).

This makes it possible to determine the state of at least one of the fixing unit, the fixing member, the secondary transfer unit, the secondary transfer member, the intermediate transfer unit, the intermediate transfer member, and the photoreceptors during the image forming operation of the print job.

In the image forming system 1 according to the present embodiment, the object moves in the main scanning direction by swinging or a steering operation.

This makes it possible to easily determine the state of the object on the basis of the movement amount and the moving direction in the main scanning direction due to the swinging or the steering operation of the object during the image forming operation of the print job.

In the image forming system 1 according to the present embodiment, a portion of interest in the read image is a streak-like image defect extending in the conveyance direction of the recording medium.

This makes it possible to reduce time and effort for specifying a cause of an image defect such as vertical streak-like density unevenness during the image forming operation of the print job.

In the image forming system 1 according to the present embodiment, the image former 13 and the reader (output-image reader 14) are integrally configured.

Alternatively, in the image forming system 1 according to the present embodiment, the image former 13 and the reader (output-image reader 14) are separate from each other and configured to be communicable with each other.

Thus, also in the image forming system having any of the above-described configurations, the state of the object can be determined during the image forming operation of the print job. That is, it is possible to reduce time and effort for determining the state of the object.

Although the present invention has been specifically described above on the basis of the embodiments, the present invention is not limited to the above-described embodiments, and can be modified without departing from the spirit and scope thereof.

For example, although the controller 11 causes the photoreceptors, the intermediate transfer unit 132, the secondary transfer unit 133, and/or the fixing unit 134 to be swung in the main scanning direction during image formation, the present invention is not limited thereto. Although controller 11 causes the intermediate transfer member, the secondary transfer member, and/or the fixing member to perform the steering operation in the main scanning direction during image formation, the present invention is not limited thereto.

During image formation, the controller 11 may cause a member that is an element included in the image former 13 and that is other than the above-described members to be swung or perform a steering operation in the main scanning direction.

Besides, the detailed configuration of each device constituting the image forming apparatus 10 and the detailed operation of each device can also be appropriately modified without departing from the spirit and scope of the present invention.

Although embodiments of the present invention have been described and illustrated in detail, the disclosed embodiments are made for purposes of illustration and example only and not limitation. The scope of the present invention should be interpreted by terms of the appended claims.

The entire disclosure of Japanese Patent Application No. 2023-112325 filed on Jul. 7, 2023 is incorporated herein by reference in its entirety.

What is claimed is:

1. An image forming system, comprising:

an object that is an element included in an image former that forms an image on a recording medium and that moves in a main scanning direction during image formation of the image based on a print job so that the object moves in the main scanning direction while the object performs an operation that causes the image to be formed on the recording medium;

a hardware processor that acquires position information of the object in the main scanning direction during the operation; and a reader that reads the image on the recording medium formed by the operations, wherein the hardware processor determines a state of the object on a basis of the acquired position information and read image data read by the reader.

2. The image forming system according to claim 1, wherein the hardware processor determines the state of the object on the basis of a movement amount of the object in the main scanning direction during the operation and a movement amount of a portion of interest in the read image in the main scanning direction during the operation.

3. The image forming system according to claim 2, wherein the hardware processor determines the state of the object on the basis of a moving direction of the object in the main scanning direction during the operation and a moving direction of the portion of interest in the read image in the main scanning direction during the operation.

4. The image forming system according to claim 2, wherein the object includes a plurality of the objects, and the hardware processor makes moving directions or movement amounts of the objects in the main scanning direction different from each other.

5. The image forming system according to claim 4, wherein in a case where correlation coefficients between the moving directions and the movement amounts of two or more objects in the main scanning direction during the operation and moving directions and movement amounts of portions of interest in the read image in the main scanning direction during the operation are equal to or greater than a predetermined value, the hardware processor makes the moving directions or the movement amounts of the two or more objects different from each other.

6. The image forming system according to claim 5, wherein the hardware processor controls moving speeds of the two or more objects to make the movement amounts different from each other.

7. The image forming system according to claim 5, wherein the hardware processor determines an object whose moving direction or movement amount is to be changed among the two or more objects on a basis of a movable distance in a moving direction of each of the two or more objects.

8. The image forming system according to claim 2, wherein the hardware processor determines that the object is defective when a correlation coefficient between a movement amount of the object in the main scanning direction during the operation and a movement amount of a portion of interest in the read image in the main scanning direction during the operation is equal to or greater than a predetermined value.

9. The image forming system according to claim 8, wherein the hardware processor determines that the object is defective when a moving direction of the object in the main scanning direction during the operation and a moving direction of a portion of interest in the read image in the main scanning direction during the operation are the same.

10. The image forming system according to claim 8, wherein the hardware processor provides notification of the object determined to be defective.

11. The image forming system according to claim 10, wherein the hardware processor prompts replacement of the object determined to be defective.

12. The image forming system according to claim 2, wherein the portion of interest in the read image is a vertical streak image defect extending in a conveyance direction of the recording medium.

13. The image forming system according to claim 1, wherein the object is at least one of a fixing unit, a fixing member, a secondary transfer unit, a secondary transfer member, an intermediate transfer unit, an intermediate transfer member, and a photoreceptor.

14. The image forming system according to claim 1, wherein the object moves in the main scanning direction by swinging or a steering operation.

15. The image forming system according to claim 1, wherein a portion of interest in the read image is a vertical streak image defect extending in a conveyance direction of the recording medium.

16. The image forming system according to claim 1, wherein the image former and the reader are integrally configured.

17. The image forming system according to claim 1, wherein an image defect in the image caused by the object exhibits a position information in the main scanning direction corresponding to the movement of the object.

* * * * *